United States Patent
Dubois et al.

(10) Patent No.: US 10,287,101 B2
(45) Date of Patent: May 14, 2019

(54) CONVEYOR ROLL ASSEMBLY, TORQUE TRANSMISSION AND SUPPORT MEANS AND PROCESS FOR MAKING A CONVEYOR ROLL ASSEMBLY USED IN A HIGH TEMPERATURE ENVIRONMENT

(71) Applicant: VESUVIUS FRANCE S.A., Feignies (FR)

(72) Inventors: Laurent Dubois, Feignies (FR); Etienne Schabaillie, Feignies (FR)

(73) Assignee: Vesuvius France S.A., Feignies (FR)

( * ) Notice: Subject to any disclaimer, the term of this patent is extended or adjusted under 35 U.S.C. 154(b) by 0 days.

(21) Appl. No.: 15/761,044

(22) PCT Filed: Sep. 15, 2016

(86) PCT No.: PCT/EP2016/071842
§ 371 (c)(1),
(2) Date: Mar. 16, 2018

(87) PCT Pub. No.: WO2017/046253
PCT Pub. Date: Mar. 23, 2017

(65) Prior Publication Data
US 2018/0273302 A1    Sep. 27, 2018

(30) Foreign Application Priority Data
Sep. 18, 2015   (EP) ..................... 15185842

(51) Int. Cl.
*F27D 3/12*       (2006.01)
*B65G 23/04*    (2006.01)
(Continued)

(52) U.S. Cl.
CPC ............ *B65G 23/04* (2013.01); *C03B 35/165* (2013.01); *C03B 35/181* (2013.01); *C03B 35/186* (2013.01); *F27D 3/12* (2013.01)

(58) Field of Classification Search
CPC ... C03B 35/165; C03B 35/181; C03B 35/186; F27D 3/12; B65G 23/04
(Continued)

(56) References Cited

U.S. PATENT DOCUMENTS 3,558,758 A  *  1/1971  Wendt et al. ........... C04B 33/28
                                                         23/313 FB
3,847,260 A  *  11/1974  Fowler ................... B65G 39/04
                                                         193/37
(Continued)

FOREIGN PATENT DOCUMENTS

DE    102011077361 A1   12/2012
EP       1853866 B1      11/2007
(Continued)

*Primary Examiner* — Douglas A Hess
(74) *Attorney, Agent, or Firm* — Thomas Clinton; Donald M. Satina

(57) ABSTRACT

A conveyor roll assembly for use at high temperature comprises (a) a ceramic spool having a flexural strength of at least 15 MPa and an external diameter D and (b) a torque transmitter and support of a general cylindrical shape and having a longitudinal axis, comprising a body and (b1) a supporting portion comprising at least one cylindrical supporting surface and (b2) a connecting portion that is mechanically and resiliently deformed, comprising at least two distinct connecting surfaces, frictionally connecting the torque transmitter and support to the ceramic spool. At least one end of the ceramic spool has an axial, centered bore of a diameter 10 mm≤d≤¾ D, and a depth Dd≥1.5 d. The torque transmitter and support is housed at least partially in the bore of the ceramic spool.

10 Claims, 2 Drawing Sheets

(51) Int. Cl.
*C03B 35/16* (2006.01)
*C03B 35/18* (2006.01)

(58) Field of Classification Search
USPC .................................. 198/788, 789; 193/37
See application file for complete search history.

(56) References Cited

U.S. PATENT DOCUMENTS

| | | | |
|---|---|---|---|
| 3,867,748 A | 2/1975 | Miller | |
| 4,167,351 A | 9/1979 | Binden | |
| 4,230,475 A | 10/1980 | Dunk | |
| 4,242,782 A | 1/1981 | Hanneken et al. | |
| 4,681,215 A * | 7/1987 | Martin | B65G 39/09 193/37 |
| 4,887,528 A | 12/1989 | Ruge et al. | |
| 5,096,051 A * | 3/1992 | Abels | B65G 39/07 198/780 |
| 5,117,970 A * | 6/1992 | Gibbs | B65G 39/07 198/808 |
| 5,875,875 A * | 3/1999 | Knotts | B60R 19/34 188/268 |
| 7,299,914 B2 * | 11/2007 | Chung | G03G 15/2053 193/37 |
| 7,846,081 B2 * | 12/2010 | Itoh | B65G 23/08 492/60 |
| 8,292,056 B2 * | 10/2012 | Tsugawa | B65G 13/073 193/35 B |
| 9,493,310 B2 * | 11/2016 | Dudek | B65G 39/02 |
| 9,618,056 B2 * | 4/2017 | Itoh | F16D 3/64 |
| 9,676,553 B2 * | 6/2017 | Wallace | B65G 13/073 |
| 9,884,736 B2 * | 2/2018 | Yamasaki | G03G 15/6511 |
| 2011/0271512 A1 | 11/2011 | Hughes | |

FOREIGN PATENT DOCUMENTS

| | | |
|---|---|---|
| FR | 2261947 A1 | 9/1975 |
| GB | 1476547 A | 6/1977 |
| GB | 2129752 A | 5/1984 |
| JP | 2012207245 A | 10/2012 |
| WO | 9915305 A1 | 4/1999 |
| WO | 2006089716 A1 | 8/2006 |

* cited by examiner

CONVEYOR ROLL ASSEMBLY, TORQUE TRANSMISSION AND SUPPORT MEANS AND PROCESS FOR MAKING A CONVEYOR ROLL ASSEMBLY USED IN A HIGH TEMPERATURE ENVIRONMENT

CROSS-REFERENCE TO RELATED APPLICATIONS

The present application is a § 371(c) national stage entry from PCT/EP2016/071842, filed on 15 Sep. 2016, which claims the benefit of foreign priority from EP 15185842.0, filed 18 Sep. 2015.

BACKGROUND OF THE INVENTION

(1) Field of the Invention

The invention relates to a conveyor roll assembly for use at high temperature, an arrangement for bringing it into rotation as well as for torque transmission and support, and to a process for assembling the roll and the torque transmitter and support.

(2) Description of the Related Art

A conveyor roll assembly used at high temperature comprises generally a ceramic spool. Typically, the ceramic spool comprises fused silica. Rolls of ceramic composition are indeed superior to metal rolls in high temperature environment. However ceramic materials are quite difficult to work and frangible. Furthermore, such rolls cannot be connected directly to the drive mechanism needed to rotate the rolls.

Different systems have been developed in the prior art. U.S. Pat. No. 4,230,475 discloses a ceramic roll engaged in compression stress between a pair of metal spindles. The metal spindles are aligned with each end of the ceramic roll through a portion extending axially inwardly in a recess of the ceramic roll. A friction material is applied to the interfacial surfaces between the end surfaces of the ceramic roll and the head of the spindles. This friction material improves the rotating driving force in a compression direction for rotating the ceramic roll. However, this system was quickly abandoned due to difficulties to assemble.

The use of metal end caps with ceramic rolls is largely preferred. The end caps allow an easy mounting to a drive. The end caps should however securely adhere to the spool, thereby allowing the spool to rotate at the desired speed. Eccentric rotation is generally undesirable, as this would create an uneven support surface for the transported article.

The different thermal expansions of the ceramic spool and the metal end caps make securely fastening the end caps to the spool difficult and can create eccentric rotations. Various methods have been proposed to overcome this difficulty. U.S. Pat. No. 4,242,782 proposes fastening end caps using rubber O-rings. O-rings can become pliable and lose holding power at elevated temperatures causing eccentric rotation of the spool and slippage between the end caps and the spool. If, by accident, the O-rings have been subjected to such elevated temperatures, they lose definitely their holding power so that even when the temperature returns to its normal value, slippage is still observed. For this reason, the fastening of end caps to a spool using O-ring is limited to applications at low temperature (lower than 250° C.).

EP-B1-1853866 solves these problems by providing an end cap with a tolerance ring interposed between the end cap and the end of the ceramic spool that fixedly and centrally secures the end caps to a ceramic spool within a wide range of application temperatures. The end cap resists a temporary overheat: the end cap and the tolerance ring will thermally expand while the dimensions of the ceramic spool will not significantly change. Thereby, the fastening power of the tolerance ring will diminish and the spool will start slipping in the end cap. When the temperature returns to normal, the end cap and tolerance ring will return to their "normal" dimensions and the holding power will be integrally recovered without causing eccentric rotation. The end cap is also easy to install. The conveyor roll assembly is also able to resist temporary jamming or seizing of the line as well as to brutal acceleration or deceleration.

The transmission torque range obtained using end caps with a tolerance ring is generally broad (up to several hundred N·m). However, at high temperature, the transmitted torque value might decrease with time. It has been established by the inventors that a minimum of transmission torque value is sufficient to bring the rolls in rotation. Consequently, end caps systems are most of the time oversized.

In addition, the roll cap reduces the utilized area of the roll and requires a large space for its connection to the drive. The roll caps cannot be re-used many times and constitute a significant manufacturing cost.

Other drawbacks linked to the use of external end caps are the following:

Loss of energy due to the thermal bridge of the metal caps between the furnace chamber and the outside environment.

No possibility to open the furnace chamber to replace a conveyor roll assembly at high temperature.

No possibility to set the furnace under pressure or under a controlled atmosphere.

No possibility of standardisation of the end caps as the end caps have a different design in order to match to the geometry of the installation.

The present invention reduces all the above cited drawbacks.

Different kind of rolls (full or hollow) are used in furnaces. The hollow rolls are preferred when the rolls are submitted to quick temperature changes or when deflection of rolls can happen. There is then a need to reduce the thermal inertia and the weight of the roll. The thickness of the hollow rolls is consequently reduced at the maximum. The internal diameter of the hole is then always higher than ¾ of the external diameter.

WO99/15305 discloses a roll assembly for high temperature applications comprising a roll body made of a nickel alum inide alloy and trunnions made of a cheaper metal material. The trunnions are attached to the roll body through mechanical connectors so that there is a gap at room temperature that decreases or closes at operating temperature due to dissimilar thermal expansions between the roll body and the trunnions. However, this assembly cannot work for ceramic rolls because of the poor tensile strength of the ceramic and the huge difference in thermal expansion coefficients between the metal and the ceramic.

U.S. Pat. No. 2,129,752 discloses a conveyor roll assembly for use at high temperature comprising a hollow ceramic spool having an axial centered bore and a torque transmission comprising two strips parallel to the longitudinal axis of the spool which are inserted into two diametrically opposing circular apertures provided in a disk closing the spool bore. This disc is locked axially and torsionally to the ceramic spool by two resilient strips forcibly inserted into the spool.

The purpose of the resilient strips is to transmit a torque but the strips do not support the spool. The spool instead rests on two idler wheels (at each end of the spool) and is connected to the bearing through rotating pins. The assembly is also very cumbersome.

JP-A-2012-207245 discloses a hollow ceramic roll consisting of a ceramic sleeve and a steel shaft connected by shrink fitting. In order to avoid stress at the contact portion between the steel shaft and the ceramic, the geometry of the steel shaft is optimized, in particular the thickness of the shaft which must be thin. The challenge is to transmit a torque by friction but taking into account the huge difference of thermal dilatation between a steel and a refractory material. The shaft surface in contact with the roll is full. The roll assembly is not cumbersome but the shrink fitting requires very accurate dimensions of the shaft surface in contact with the roll, which will then be more expensive to produce. In addition, the calculated dimensions of the shaft surface will vary according to the nature of the roll: the thermal behavior of the mullite is indeed very different of that of fused silica. The connection between the shaft and the roll is optimized for a very narrow range of temperature and conventionally requires cooling. The assembly described in JP-A-2012-207245 recites a hollow roll cooled by air having a diameter of the bore >¾ of the external diameter. It has to be noticed that this kind of connection will not work at room temperature and is not re-usable as the dismantlement of the assembly is an issue.

BRIEF SUMMARY OF THE INVENTION

The present invention is a roll assembly wherein the torque transmitter and support is able to work within a large range of temperature, without the need of cooling, with different material rolls and which is re-usable. This torque transmitter and support transmits a torque, supports the roll (there is no need of external supporting elements) and allows a direct connection to the bearing (or another driving element) reducing the required space for the connection. The connection is made by simply pushing the torque transmitter and support inside a bore of the roll. No shrink fitting is used. The torque transmission results from the resiliently mechanical deformation of the connecting portion while the support results from the presence of at least a supporting surface.

A frictional connection between the torque transmitter and support arranged inside a bore of a ceramic spool and the ceramic spool is sufficient to transfer a torque from a rotary drive to the ceramic spool. It is to be noted that the skilled person would not normally have been inspired to arrange the torque transmitter and support in a bore inside the ceramic spool due to the bad reputation of the flexural strength of the ceramic material. It is also to be noted that the fact that a very low transmitted torque is sufficient for driving the roll into rotation had never been established in the prior art.

According to the invention, an end cap is no longer needed and is replaced by the torque transmitter and support. In case of a temporary overheat; the torque transmitter and support arranged inside the ceramic spool is less subject to temperature change as it is somewhat isolated from the outside environment. With a severe increase of temperature, the fastening power will increase because the thermal expansion of the torque transmitter and support and the process will continue without any perturbations.

Other advantages of the invention are the following:

the manufacturing of the torque transmitter and support according the invention is cheaper than the usual end caps: in particular, for rolls with very large diameters (for example LOR). An external end cap has a significant dimension and is quite expensive; according to the invention, the external dimensions of the torque transmitter and support are significantly smaller.

the torque transmitter and support being thermally isolated by the ceramic of the roll, higher temperatures applications in furnaces can be considered.

in case of a non-voluntary high transmission torque, the system will act as a fuse.

the assembly is self-centering. Indeed, there is always a contact between the ceramic spool and the torque transmitter and support.

The present invention provides a connection which is almost not affected by the temperature as full rolls are most suitable for this invention. On the other hand, external assemblies are usually becoming loose with heat.

The present invention proposes a conveyor roll assembly for use at high temperature comprising (a) a ceramic spool having a first end and a second end, a flexural strength of at least 15 MPa and an external diameter D, and (b) a torque transmitter and support having a general cylindrical shape, having a longitudinal axis, and having a supporting end and a connecting end disposed distally to the supporting end, the torque transmitter and support comprising a body and (b1) a supporting portion, located at the supporting end, comprising at least one cylindrical supporting surface and (b2) a connecting portion, located at the connecting end, that is mechanically and resiliently deformed, comprising at least two distinct connecting surfaces, frictionally connecting the torque transmitter and support to the ceramic spool, wherein at least the first end of the ceramic spool has an axial, centered bore of a diameter 10 mm $\leq d \leq ¾ D$, and a depth $Dd \geq 1.5 d$, and wherein the torque transmitter and support is housed at least partially in the bore of the ceramic spool. The second end of the ceramic spool may have an end cap. The connecting portion may be arranged between two longitudinally-separated cylindrical supporting surfaces. The body may have a part protruding longitudinally out of the ceramic spool that is connected to a rotary drive and the connecting portion may be arranged between the body and the ceramic spool. The body and the connecting portion may form at least two distinct elements. The body may comprise a groove adapted to receive at least partially an open tolerance ring of resilient metal having a plurality of circumferentially arranged corrugations. The connecting portion may comprise elongated holes having a major axis parallel to the longitudinal axis of the torque transmitter and support, said holes defining elongated strips, said strips comprising at least a thicker portion. The thicker portions of the strips may be arranged radially. The supporting portion of the body is separated from a portion connectable to a drive by a ring having a diameter bigger than the external diameter of the support portion.

The ceramic spool must have flexural strength of at least 15 MPa so that the spool can resist the introduction of the torque transmitter and support which can be done by a technique as simple as using a mallet. The connecting portion of the torque transmitter and support is then mechanically and resiliently deformed so that both elements ((torque transmitter and support) and spool) are mechanically connected; the connection being realized by the friction generated by the resiliently deformed connecting portion. The supporting portion of the torque transmitter and support is not substantially deformed and serves to support to spool from the inside. The torque transmitter and support returns to its original shape when it is taken out the ceramic spool. It is to be observed that the torque is transmitted by connecting surfaces that are arranged on the outside surface of the torque transmitter and support. The diameter (d) of the axial centered bore receiving the torque transmitter and support must be higher than or equal to 10 mm but less than ¾ of the external diameter (D) of the roll. A diameter larger than ¾ of D makes the end of the roll frangible while a minimum of 10 mm is required to introduce an effective torque transmitter and support. The diameter of the bore may be lower than or equal to ⅓ of the external diameter (D). The depth (Dd) of the axial centered bore is also an important parameter. Hollow rolls can be used but most of the time they are full and are drilled. A depth of at least 1.5 times the diameter of the bore (d) is practical. Again below this value, the end of the roll is more frangible and problem of co-axiality can occur. A torque transmitter and support according to the invention may have a general cylindrical shape, a longitudinal axis, and a supporting end and a connecting end disposed distally to the supporting end. The torque transmitter and support may comprise a body and (a) a supporting portion, located at the supporting end, comprising at least one cylindrical supporting surface, and (b) a connecting portion, located at the connecting end, comprising at least two distinct connecting surfaces, wherein the connecting portion comprises elongated holes having a major axis parallel to the longitudinal axis of the torque transmitter and support, said holes defining elongated strips, said strips comprising at least a thicker portion, and wherein the connecting portion is mechanically and resiliently deformable. The connecting portion may be arranged between two cylindrical supporting surfaces. The thicker portions of the strips may be arranged radially. The supporting portion of the torque transmitter and support may be separated from a portion connectable to a drive by a ring having a diameter bigger than the external diameter of the support portion.

BRIEF DESCRIPTION OF THE SEVERAL VIEWS OF THE DRAWINGS

The invention will be better understood from reading the description which will follow, given solely by way of examples and made with reference to the drawings in which.

DETAILED DESCRIPTION OF THE INVENTION

Figure 1:
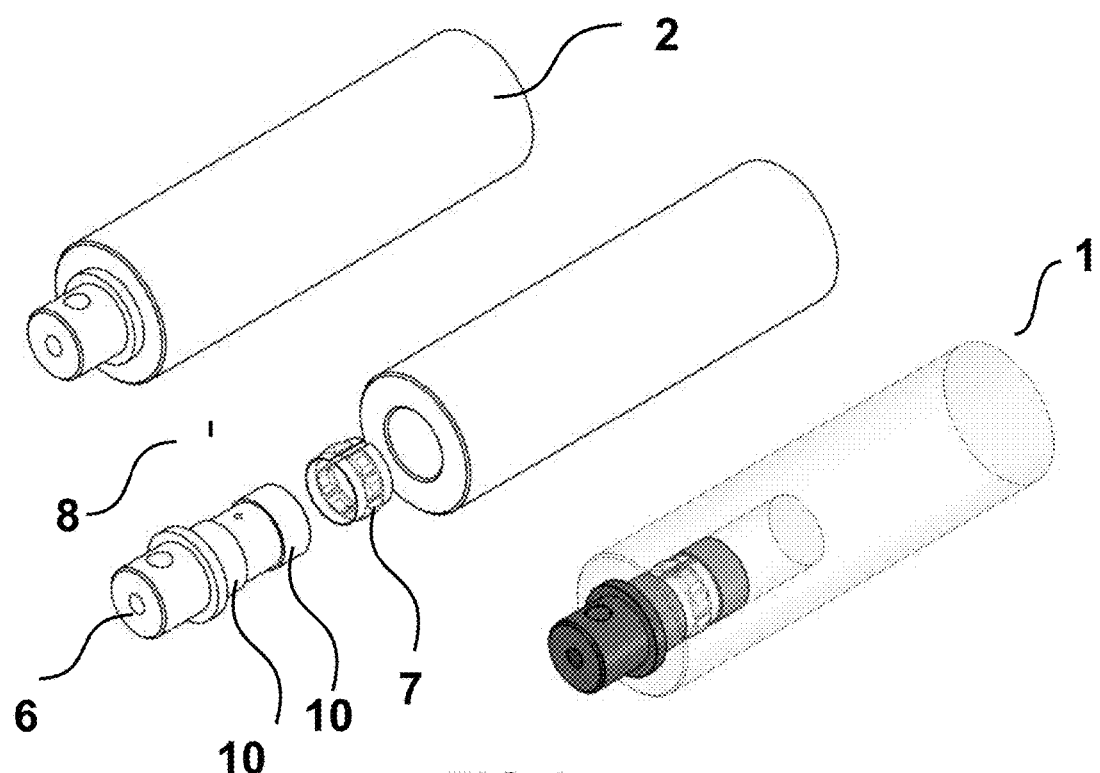
FIG. 1 is a perspective view of an assembly of a conveyor roll according to one embodiment of the invention.
Figure 2:
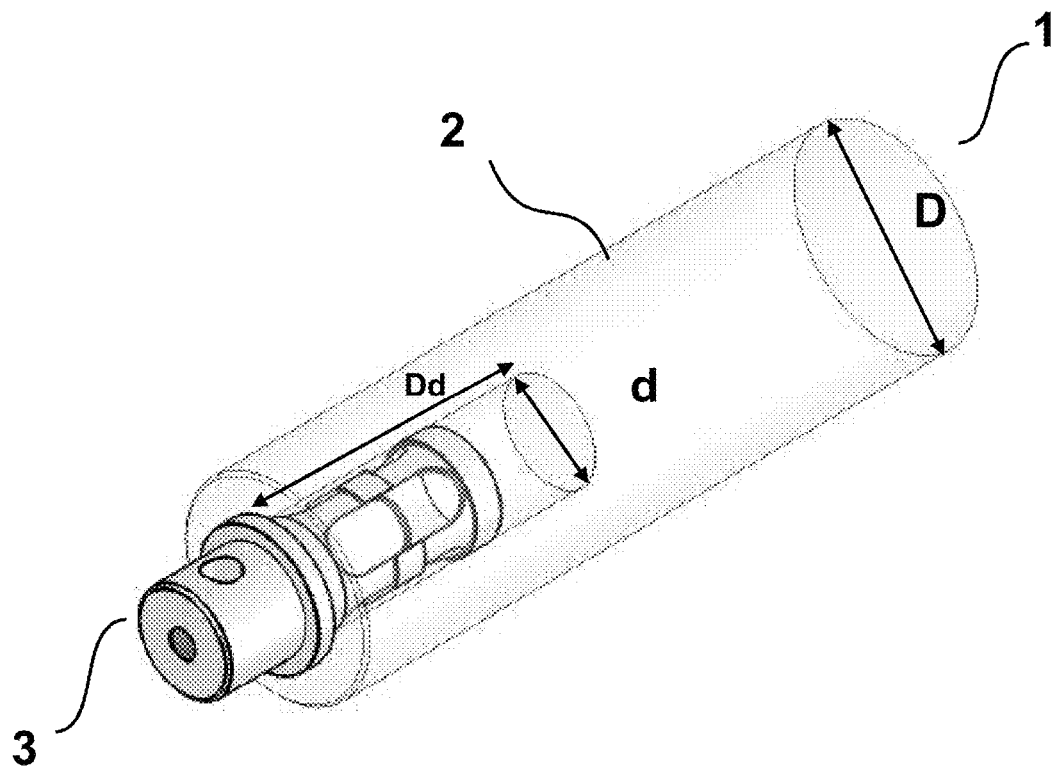
FIG. 2 is a perspective view of an assembly of a conveyor roll according to another embodiment of the invention.
Figure 3:
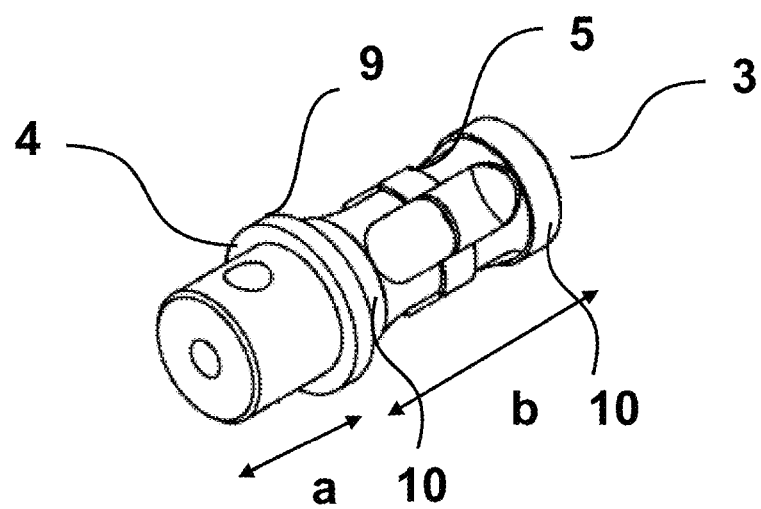
FIG. 3 is a perspective view of torque transmitter and support 3 of FIG. 2 according to one practical configuration.

FIG. 1 depicts an assembly of a ceramic spool 2 and of a torque transmitter and support comprising a body 6 having a part connectable to a rotary drive and a connecting portion such as a tolerance ring 7 is arranged between the body and the ceramic. A pin 8 blocks the possible rotation of the tolerance ring 7.
 FIG. 2 depicts the geometrical features of the ceramic spool 2. D is the external diameter of the ceramic spool 2; d represents the diameter of the axial centered bore of the ceramic spool 2. Dd represents the depth of the axial centered bore of the ceramic spool 2.
 FIG. 3 depicts a torque transmitter and support 3. The torque transmitter and support is made in one piece and has a general cylindrical shape with a longitudinal axis. The torque transmitter and support 3 comprises a supporting portion comprising two cylindrical supporting surfaces 10 and a connecting portion comprising at least two distinct connecting surfaces. The connecting portion comprises elongated holes having a major axis parallel to the longitudinal axis of the torque transmitter and support 3, said holes defining elongated strips, said strips comprising at least a thicker portion 5.

A torque test was carried out and a torque up to 18 N·m could be transmitted using torque transmitter and support 3 according to the invention.

Even after being heated up to 300° C., the torque transmitter and support 3 was still able to transmit a torque over 15 N·m.

In a first embodiment of the invention, the conveyor roll assembly comprises a torque transmitter and support comprising a body having a part protruding out of the ceramic spool connectable to a rotary drive and the connecting portion is arranged between the body and the ceramic spool. The body and the connecting portion are two distinct elements. The connecting portion can be an open tolerance ring of resilient metal having a plurality of circumferentially arranged corrugations. The tolerance ring sets in a groove of the body to prevent any axial displacement. The use of a tolerance ring can accommodate minor variations in the diameter of the inner and outer components in addition to its easy installation.

An increase of the torque transmission value was even observed when the tolerance ring is not free in rotation around the body of the torque transmitter and support. A blocking device like a pin can be used to block the rotation of the torque transmitter and support.

For manufacturing, logistic and cost reasons, a conveyor roll assembly wherein the torque transmitter and support 3 is made in one piece, is preferred: The connecting portion comprises elongated holes having a major axis parallel to the longitudinal axis of the torque transmitter and support 3, said holes defining elongated strips, said strips comprising at least a thicker portion.

The thicker portions 5 of the strips which are the distinct connecting surfaces are arranged preferably radially i.e. the thicker portions are distributed on a circumference and separated by an angle.

The torque transmitter and support 3 may comprise a gas exhaust such as a hole, in order to allow the air to escape from the bore when installing the torque transmitter and support 3 inside the ceramic spool.

The number and design of the thicker portions depend on the torque value required to be transmitted.

It has been observed that these roll assemblies are specially used for application where low torque transmission is required. When higher values are needed—for instance when different roll speeds are required-, the end cap as described in EP-B1-1853866 can be used on one end of the ceramic spool while the end cap on the second end can be advantageously replaced by the present torque transmitter and support 3.

The ceramic spool 2 may comprise fused silica.

The present invention also relates to a torque transmitter and support 3 of a general cylindrical shape and having a longitudinal axis which are used in the roll and which comprise a body, a supporting portion comprising at least one cylindrical supporting surface 10 and a connecting portion comprising at least two distinct connecting surfaces wherein the connecting portion comprises elongated holes having a major axis parallel to the longitudinal axis of the torque transmitter and support 3, said holes defining elongated strips, said strips comprising at least a thicker portion. The connecting portion is mechanically and resiliently deformable.

The connecting portion may be arranged between two cylindrical supporting surfaces 10. The support function of the cylindrical surfaces is then optimized.

One practical configuration of the torque transmitter and support 3 described herein contains a supporting portion that is separated from a portion connectable to a drive by a ring having a diameter bigger than the external diameter of the supporting portion. The abutment surface 4 of the ring 9 allows a straightforward positioning when introducing the torque transmitter and support 3 inside the ceramic spool. The connecting portion is mechanically and resiliently deformable to provide a frictional connection with the ceramic spool.

The invention relates also to a process for making a conveyor roll assembly comprising the steps of
providing a ceramic spool having a first end, a second end, a flexural strength of at least 15 MPa and an external diameter D and at least the first end of the ceramic spool having an axial, centered bore of a diameter 10 mm<d<¾ D and a depth Dd>1.5 d,
providing a torque transmitter and support 3 having a longitudinal axis, comprising
  b1. a supporting portion comprising at least one cylindrical supporting surface 10 and,
  b2. a connecting portion comprising at least two distinct connecting surfaces,
introducing the torque transmitter and support 3 at least partially into said bore of the ceramic spool 2; the connecting surfaces are then frictionally connecting the torque transmitter and support 3 to the ceramic spool 2, so as to deform mechanically and resiliently the connecting portion and to frictionally connect the torque transmitter and support 3 to the ceramic spool 2.

LIST OF REFERENCES

1. Assembly of a ceramic spool and a torque transmitter and support 3
2. Ceramic spool
3. Torque transmitter and support 3
4. Abutment surface of the ring 9
5. Thicker portion
6. Torque transmitter and support 3 body
7. Tolerance ring
8. Pin
9. Ring
10. Supporting surface
D is the external diameter of the ceramic spool 2
d represents the diameter of the axial centered bore of the ceramic spool 2
Dd represents the depth of the axial centered bore of the ceramic spool 2

We claim:

1. A conveyor roll assembly for use at high temperature comprising
   a) a ceramic spool having a first end and a second end, a flexural strength of at least 15 MPa and an external diameter D and at least the first end of the ceramic spool has an axial, centered bore of a diameter d, and a depth Dd≤1.5 d and,
   b) a torque transmitter and support having a general cylindrical shape, having a longitudinal axis, being provided at least partially in the bore of the ceramic spool, and having a supporting end and a connecting end disposed distally to the supporting end, the torque transmitter and support comprising a body and
      b1. a supporting portion, located at the supporting end, that is substantially not deformed and is configured to support the spool from the inside, comprising at least two cylindrical supporting surfaces and,
      b2. a connecting portion, located at the connecting end, that is mechanically and resiliently deformed by the introduction of the torque transmitter and support inside the ceramic spool,
   said connecting portion being capable of returning to its original shape when the torque transmitter and support is removed from the ceramic spool,
   said connecting portion comprising at least two distinct connecting surfaces, frictionally connecting the torque transmitter and support to the ceramic spool,
   wherein the connecting portion is arranged between two cylindrical supporting surfaces and the diameter of the center bore of the ceramic spool is 10 mm≤d≤¾ D.

2. A conveyor roll assembly according to claim 1, wherein the second end of the ceramic spool has an end cap.

3. A conveyor roll assembly according to claim 1, wherein the ceramic spool comprises fused silica.

4. A conveyor roll assembly according to claim 1, wherein the body has a part protruding longitudinally out of the ceramic spool that is connectable to a rotary drive and wherein the connecting portion is arranged between the body and the ceramic spool.

5. A conveyor roll assembly according to claim 4 wherein the body and the connecting portion form at least two distinct elements.

6. A conveyor roll assembly according to claim 5, wherein the body comprises a groove adapted to receive at least partially an open tolerance ring of resilient metal having a plurality of circumferentially arranged corrugations.

7. A conveyor roll assembly according to claim 1 wherein the connecting portion comprises elongated holes having a major axis parallel to the longitudinal axis of the torque transmitter and support, said holes defining elongated strips, said strips comprising at least a thicker portion.

8. A conveyor roll assembly according to claim 7, wherein the thicker portions of the strips are arranged radially.

9. A conveyor roll assembly according to claim 7, wherein the supporting portion of the body is separated from a portion connectable to a drive by a ring having a diameter bigger than the external diameter of the support portion.

10. Process for making a conveyor roll assembly according to claim 1, comprising the steps of
   1) providing a ceramic spool having a first end, a second end, a flexural strength of at least 15 MPa and an external diameter D and at least the first end of the ceramic spool having an axial, centered bore of a diameter 10 mm≤d≤¾ D, and a depth Dd≥1.5 d,
   2) providing a torque transmitter and support having a longitudinal axis, comprising
      b1. a supporting portion comprising at least one cylindrical supporting surface and,
      b2. a connecting portion comprising at least two distinct connecting surfaces,
   3) introducing the torque transmitter and support at least partially into said bore of the ceramic spool,
   so as to deform mechanically and resiliently the connecting portion and to frictionally connect the torque transmitter and support to the ceramic spool.

* * * * *